UNITED STATES PATENT OFFICE.

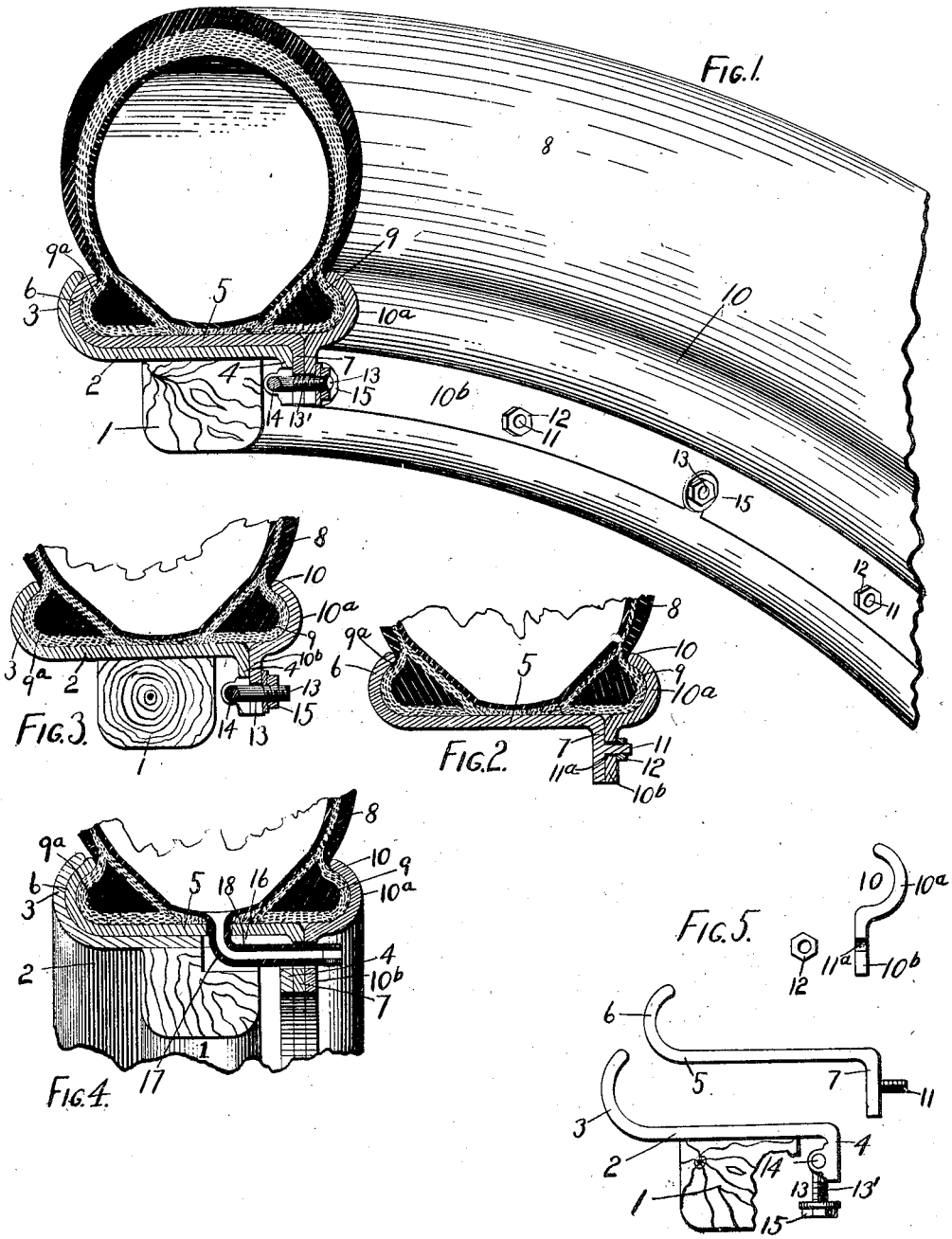

GEORGE S. VAN VOORHIS, OF BOSTON, MASSACHUSETTS.

REMOVABLE RIM FOR VEHICLE-WHEELS.

934,862.

Specification of Letters Patent. Patented Sept. 21, 1909.

Application filed March 13, 1908. Serial No. 420,864.

*To all whom it may concern:*

Be it known that I, GEORGE S. VAN VOORHIS, a citizen of the United States, residing at Boston, Massachusetts, have invented certain new and useful Improvements in Removable Rims for Vehicle-Wheels, of which the following is a specification.

My present invention relates to improvements in fellies and rims for motor vehicles.

Owing to the weight of the load carried and the excessive strains encountered in rounding turns at high speeds and the rough usages of the roads, the effectively securing of cushion or pneumatic tires to metallic rims is attended with many difficulties, and requires a character of fastening means which precludes the possibility of quick removal and replacement upon the road.

I have aimed in devising my present invention to provide a construction which will enable the removal and replacement to be readily effected by providing the quick detachable connections between metal parts which do not present such difficult problems as connections between rubber and metal. I thus enable an automobilist to carry one or more extra or reserve cushion or pneumatic tires already securely attached to extra rims so that in case of accident to a tire upon the road the rim with its damaged tire may be easily and quickly removed and replaced by the reserve one, leaving the more tedious operation of disconnecting the damaged rubber tire from and reconnecting a fresh tire to the rim to be performed at a more convenient season.

I have shown in the accompanying drawings and described in the following specification the tire as a pneumatic tire of the ordinary clencher type, but it is to be understood that this is merely representative of any suitable detachable cushion tire, using the term cushion in its broadest sense.

The invention includes the novel features of construction and arrangement and combination of parts hereinafter described and particularly pointed out in the appended claim.

An embodiment of my invention is illustrated in the accompanying drawings, in which,—

Figure 1 is a sectional perspective view showing the assembled rim and tire. Fig. 2 is a transverse section showing the removable rim with the tire carried thereby. Fig. 3 is a view similar to Fig. 2 showing the tire applied directly to the permanent rim. Fig. 4 is a sectional view taken through the tire and rim in proximity to the inflated valve, and Fig. 5 is a detail view of the rim parts showing them separate.

Referring by reference characters to these drawings, the number 1 designates the wooden felly of the ordinary motor vehicle to which the rim 2 is permanently secured in the ordinary or any desirable manner. This rim has at one side an upwardly turned continuous flange 3 which is curved upwardly and inwardly as shown. Upon the opposite side the rim 2 is provided with a downwardly turned flange 4 which preferably extends at right angles to the main or horizontal portion of the rim. Resting upon the rim 2 is an inner or removable rim 5 which conforms in shape to the rim 2, having likewise an upwardly and inwardly curved flange 6 upon one side and downwardly extending right angle flange 7 upon the opposite side. When the removable rim is in place upon the permanent rim as shown in Fig. 1, the side flanges 3 and 6, which are concentric, rest the one within the other, and the downwardly extending flange 7 abuts against the side face of the flange 4. The shoe or outer case of the tire which is designated by the numeral 8 is provided with the ordinary beads or enlargements 9 and 9$^a$, the latter of which rests in the channel formed by the flange 6. The channel for the rib or bead 9 of the opposite edge of the shoe is formed by the curved part 10$^a$ of a removable rim portion 10, which has a plain flange 10$^b$, designed to abut against the face of the flange 7. The flange 7 has a plurality of horizontal projecting threaded bolts or extensions 11, which are designed to pass through corresponding openings 11$^a$ in the flange portion 10$^b$ so that by means of the nuts 12 the removable flange 10 may be bolted securely and directly to the flange 7 of the removable rim 5 independent of any connection between the removable rim 5 and the permanent rim 2. The removable rim 5 with its attached channel strip or portion 10, forms a complete removable tire holding rim which in case of the collapse of the tire by reason of puncture or the like, may be quickly or easily removed from the permanent rim by simply sliding it laterally therefrom and replaced by a separate rim with its previously inflated tire. The removable rim is held against lateral displacement upon the permanent rim by means of swinging bolts 13 which have hinged portions 14 upon the inner face of the flange 4, the body 13' of each bolt being adapted to be swung into vertical slots or recesses in the flanges 7 and 10$^b$. These bolts carry nuts 15 so that when swung into horizontal position as shown in Fig. 2 the tightening of the nuts hold the removable rim firmly in place upon the permanent rim.

If for any reason the user of the motor vehicle should not care to use the removable rim, or should desire to apply his clencher tire in the ordinary manner this may be readily accomplished by simply removing the removable rim portion 5, and attaching the removable flange 10 directly to the flange 4 as shown in Fig. 3. With the parts in this position the clencher tire may be applied and removed in the ordinary manner, or if desired by the user repairs of puncture may be effected by removal of the flange 10 which enables repairs to be more readily made than the ordinary construction in which the channel portions are integral with the main portion of the rim.

It will of course be obvious that with the construction above described the ordinary form of valve stem cannot be used as were it extended straight through the felly it would serve to lock the removable rim against lateral movement. To avoid this I provide the permanent rim and the wooden felly with a slotted or recessed portion as indicated at 16 and give the valve stem an angular bend 17, the horizontal portion 18 of such stem extending through an opening in the flanges 7 and 10$^b$.

I claim as my invention:—

In a vehicle wheel, a permanent rim having an integral outwardly extending flange on one side and an inwardly extending flange on the other, a removable rim seated on the permanent rim and having outwardly extending rim retaining flanges and an inwardly extending flange abutting against the inwardly extending flanges of the permanent rim, said inwardly extending flanges having open ended slots, and pivotally attached locking bolts resting in said slots.

In testimony whereof, I affix my signature in presence of two witnesses.

GEORGE S. VAN VOORHIS.

Witnesses:
　LEON A. MARSON,
　ERLE A. BISHOP.